United States Patent
Hara et al.

(10) Patent No.: US 11,276,849 B2
(45) Date of Patent: Mar. 15, 2022

(54) POSITIVE ELECTRODE FOR NON-AQUEOUS ELECTROLYTE SECONDARY BATTERY, AND NON-AQUEOUS ELECTROLYTE SECONDARY BATTERY

(71) Applicant: ELIIY Power Co., Ltd., Tokyo (JP)

(72) Inventors: Tomitaro Hara, Shinagawa-ku (JP); Yusuke Kuzushima, Shinagawa-ku (JP)

(73) Assignee: ELIIY POWER CO., LTD, Tokyo (JP)

( * ) Notice: Subject to any disclaimer, the term of this patent is extended or adjusted under 35 U.S.C. 154(b) by 228 days.

(21) Appl. No.: 16/301,004

(22) PCT Filed: May 12, 2016

(86) PCT No.: PCT/JP2016/064164
§ 371 (c)(1),
(2) Date: Nov. 13, 2018

(87) PCT Pub. No.: WO2017/195331
PCT Pub. Date: Nov. 16, 2017

(65) Prior Publication Data
US 2019/0181424 A1 Jun. 13, 2019

(51) Int. Cl.
*H01M 4/133* (2010.01)
*H01M 10/0525* (2010.01)
(Continued)

(52) U.S. Cl.
CPC .......... *H01M 4/133* (2013.01); *H01M 4/13* (2013.01); *H01M 4/131* (2013.01); *H01M 4/583* (2013.01);
(Continued)

(58) Field of Classification Search
CPC .... H01M 4/133; H01M 4/583; H01M 4/1393; H01M 4/663
See application file for complete search history.

(56) References Cited

U.S. PATENT DOCUMENTS

| 2003/0148187 A1 | 8/2003 | Yamaguchi et al. |
| 2004/0131945 A1* | 7/2004 | Zushi ............ H01M 10/0587 429/316 |

(Continued)

FOREIGN PATENT DOCUMENTS

| CN | 1463473 A | 12/2003 |
| CN | 103636032 A | 3/2014 |

(Continued)

OTHER PUBLICATIONS

Wypych, G., "Fillers—Origin, Chemical Composition, Properties, and Morphology," Handbook of Fillers, Feb. 12, 2016, XP055629569 (see Extended European Search Report).

(Continued)

*Primary Examiner* — Edward J. Schmiedel
(74) *Attorney, Agent, or Firm* — Stites & Harbison, PLLC; Terry L. Wright; Jeffrey A. Haeberlin

(57) ABSTRACT

The present invention provides a positive electrode for non-aqueous electrolyte secondary battery, having novel overcharge protection functions. The present invention provides a positive electrode for non-aqueous electrolyte secondary battery, comprising a carbon layer and a positive-electrode active material layer provided on the carbon layer, wherein the carbon layer includes graphitizable carbon.

8 Claims, 7 Drawing Sheets

(51) Int. Cl.
  *H01M 10/42* (2006.01)
  *H01M 4/13* (2010.01)
  *H01M 4/62* (2006.01)
  *H01M 4/66* (2006.01)
  *H01M 4/131* (2010.01)
  *H01M 4/583* (2010.01)
  *H01M 10/0569* (2010.01)
  *H01M 4/36* (2006.01)
  *H01M 4/02* (2006.01)

(52) U.S. Cl.
  CPC .......... *H01M 4/621* (2013.01); *H01M 4/625* (2013.01); *H01M 4/661* (2013.01); *H01M 4/663* (2013.01); *H01M 10/0525* (2013.01); *H01M 10/0569* (2013.01); *H01M 10/4235* (2013.01); *H01M 4/366* (2013.01); *H01M 2004/028* (2013.01)

(56) References Cited

U.S. PATENT DOCUMENTS

| | | | |
|---|---|---|---|
| 2006/0175704 A1* | 8/2006 | Shimizu | H01M 4/0402 257/758 |
| 2009/0246561 A1 | 10/2009 | Johnson et al. | |
| 2011/0129739 A1 | 6/2011 | Nakanishi | |
| 2012/0135298 A1* | 5/2012 | Yamada | H01M 10/0525 429/163 |
| 2012/0244430 A1* | 9/2012 | Yamazaki | H01M 4/131 429/211 |
| 2014/0120423 A1 | 5/2014 | Matsuo et al. | |
| 2015/0086860 A1* | 3/2015 | Yokoi | H01M 4/133 429/188 |
| 2015/0191357 A1* | 7/2015 | Yang | C01B 32/336 428/34.1 |
| 2016/0093877 A1 | 3/2016 | Umeyama et al. | |
| 2016/0351907 A1 | 12/2016 | Tsutsumi | |

FOREIGN PATENT DOCUMENTS

| | | | |
|---|---|---|---|
| CN | 105470578 A | 4/2016 | |
| EP | 0 020 061 A1 | 12/1980 | |
| JP | 2000-164206 A | 6/2000 | |
| JP | 2015-65134 A | 4/2015 | |
| JP | 2015-070032 A | 4/2015 | |
| WO | WO-2014015709 A1 * | 1/2014 | H01M 4/583 |
| WO | 2015/118691 A1 | 8/2015 | |

OTHER PUBLICATIONS

European Patent Office, Extended European Search Report issued in corresponding Application No. 16901679.7, dated Oct. 17, 2019.

* cited by examiner

[FIG. 1]
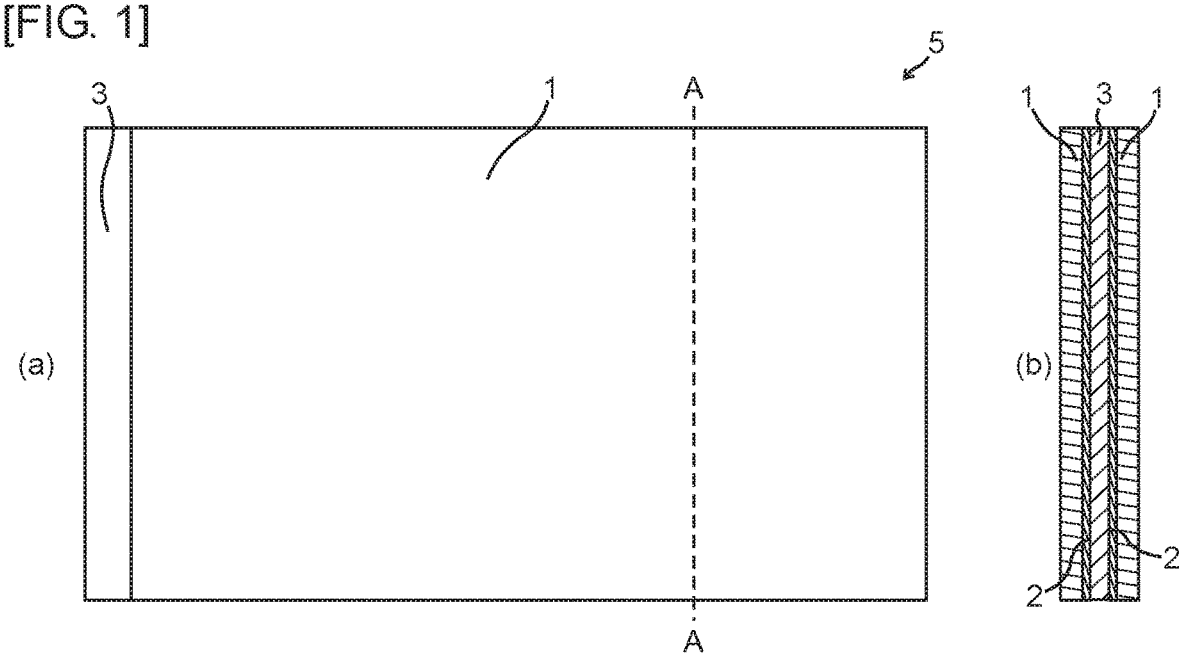
[FIG. 2]
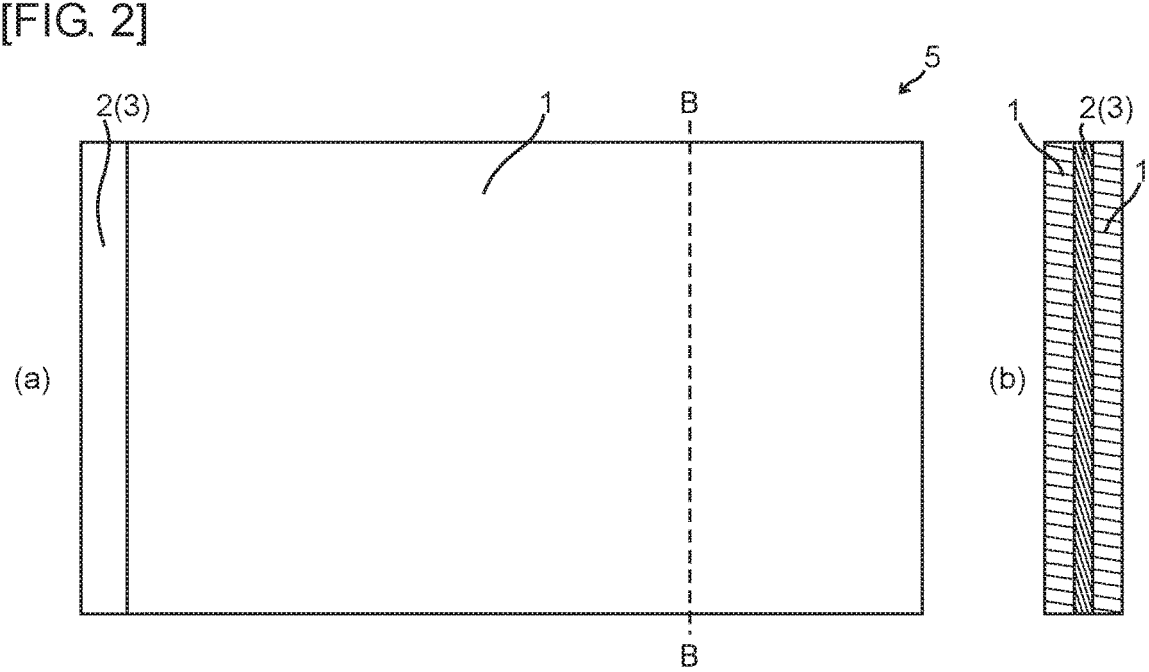

[FIG. 3]
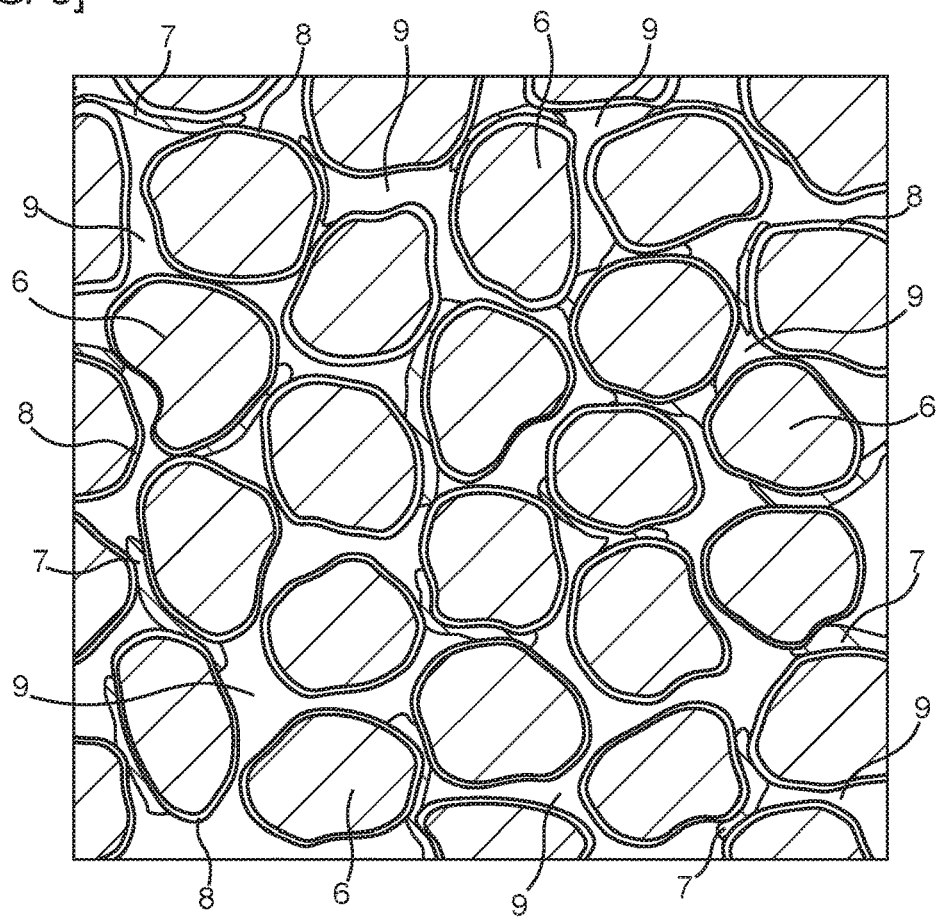
[FIG. 4]
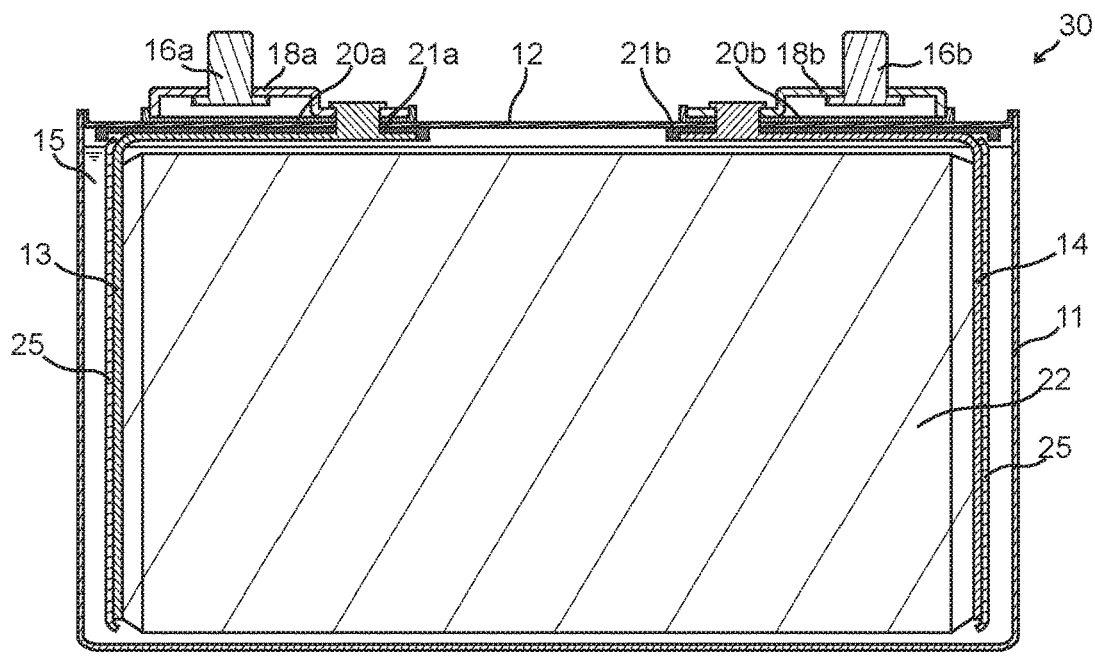

[FIG. 5]
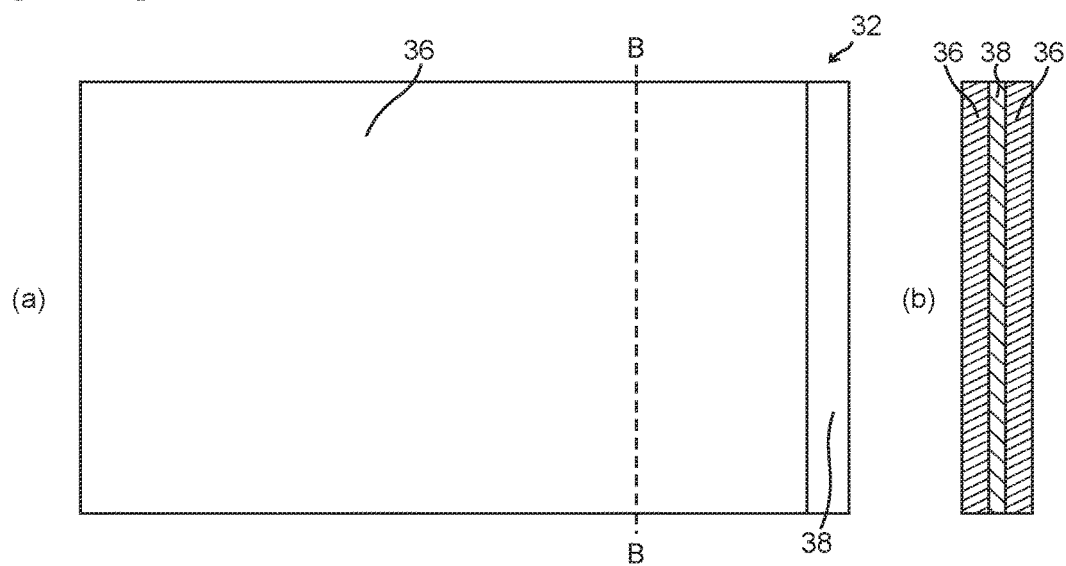
[FIG. 6]
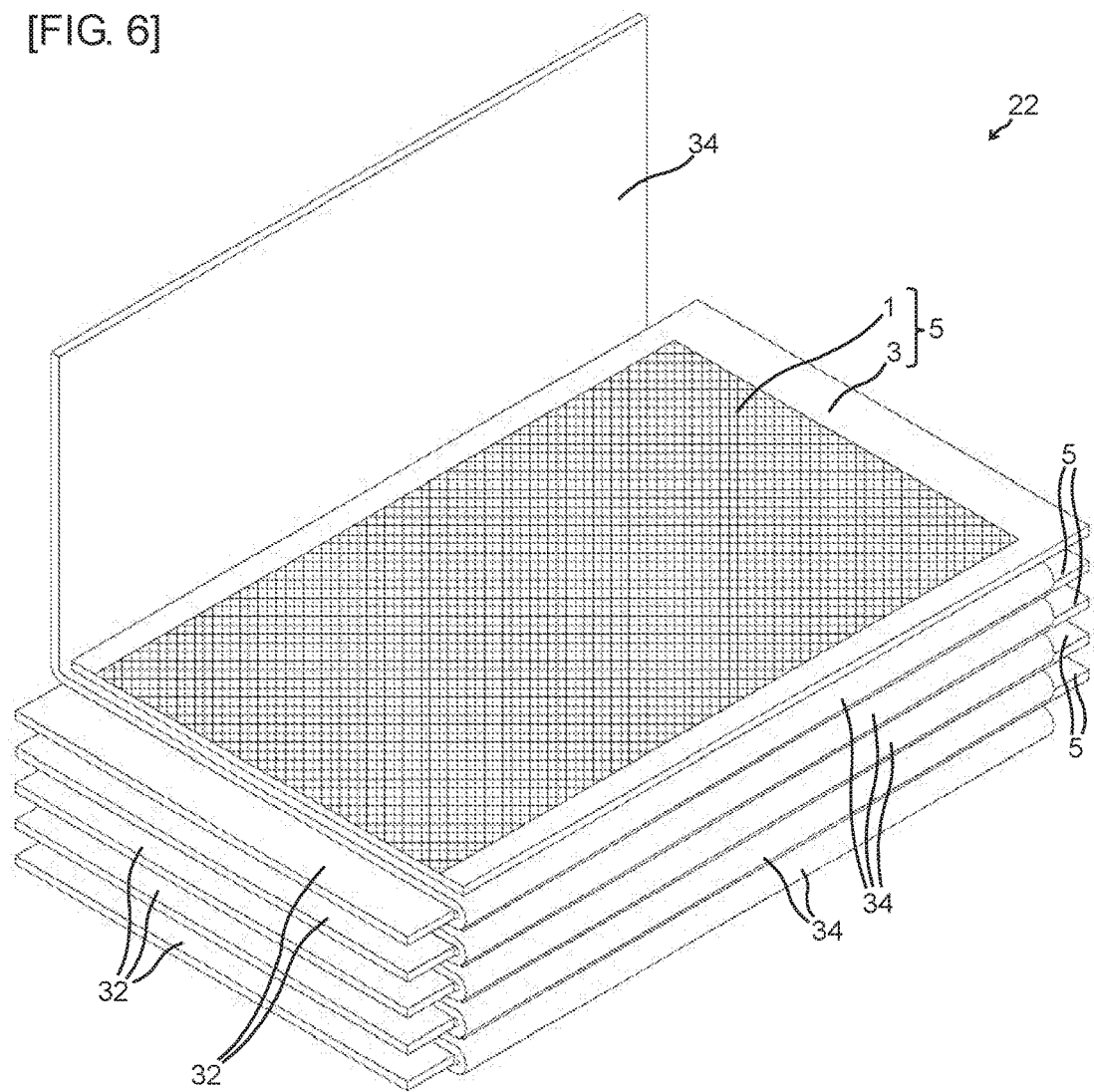

[FIG. 7]
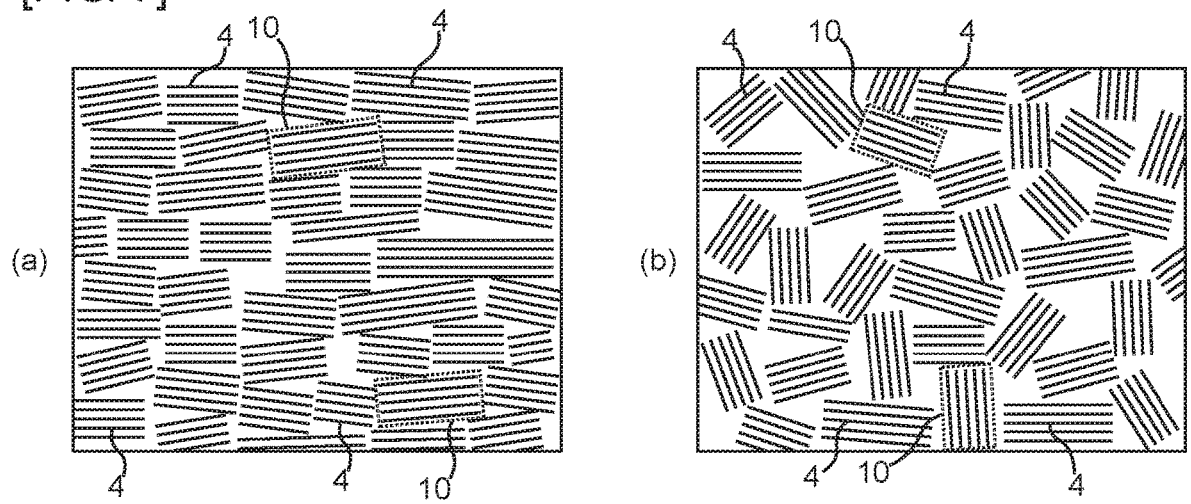
[FIG. 8]
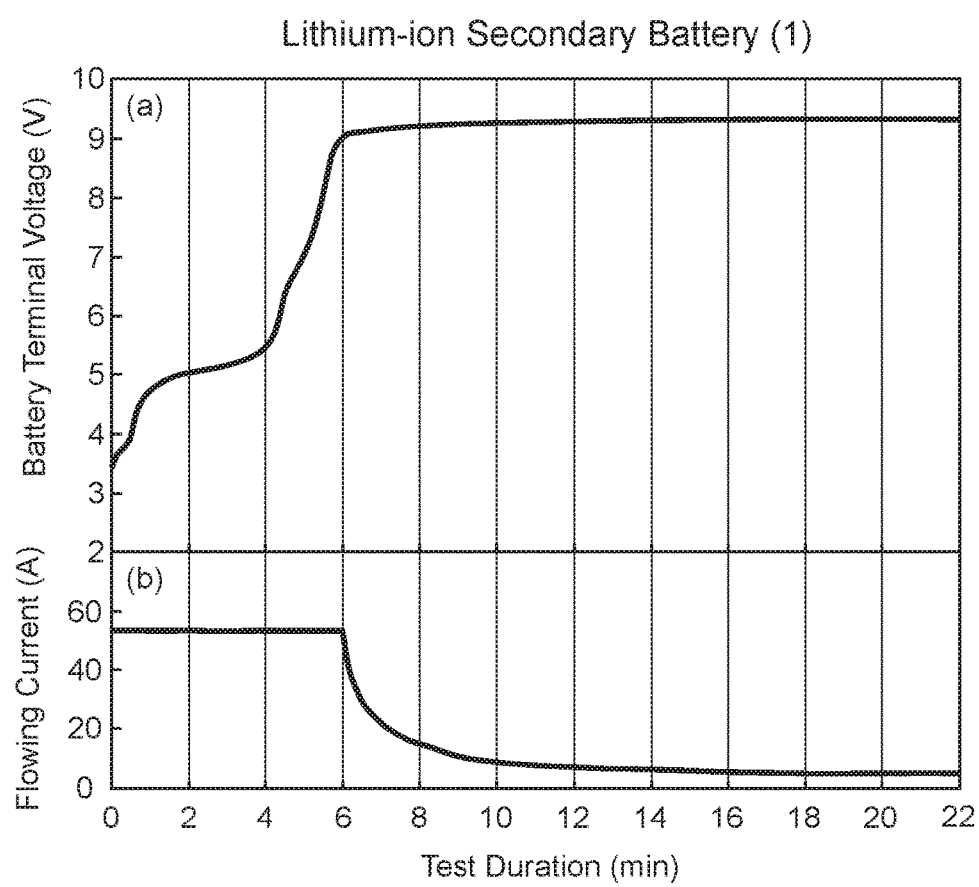

[FIG. 9]
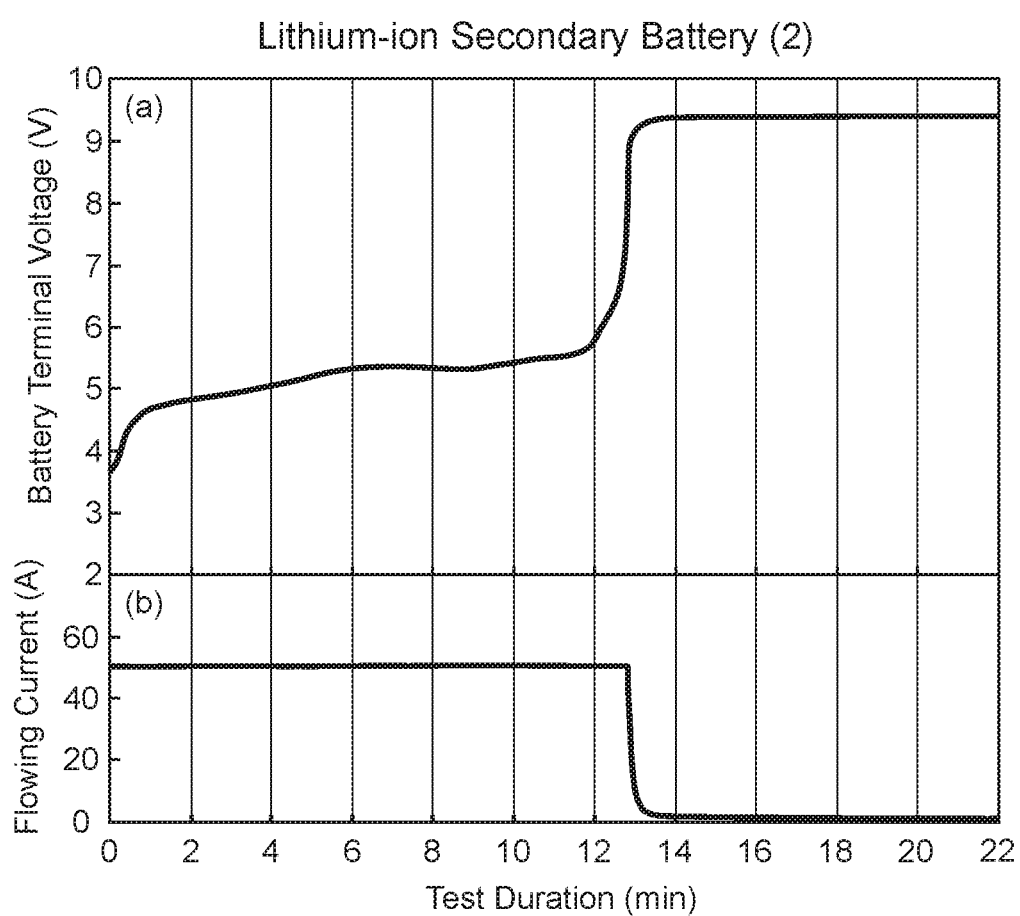

[FIG. 10]
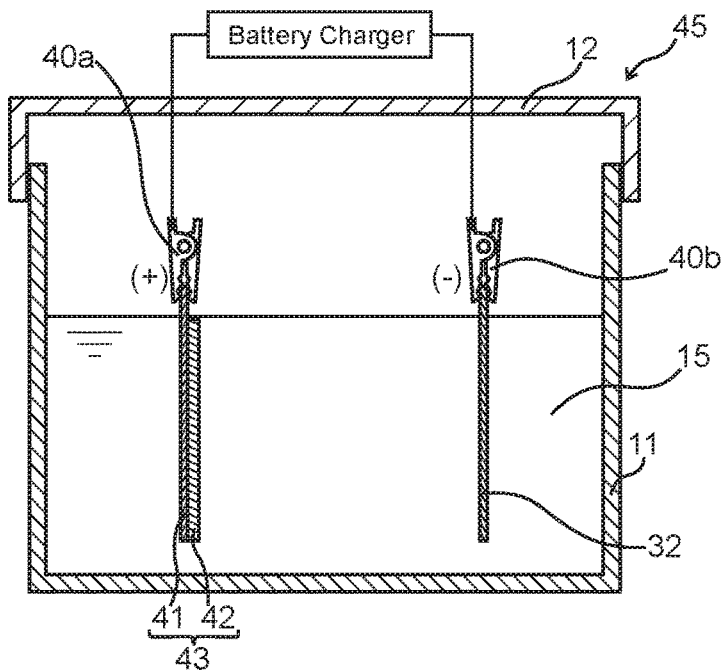
[FIG. 11]
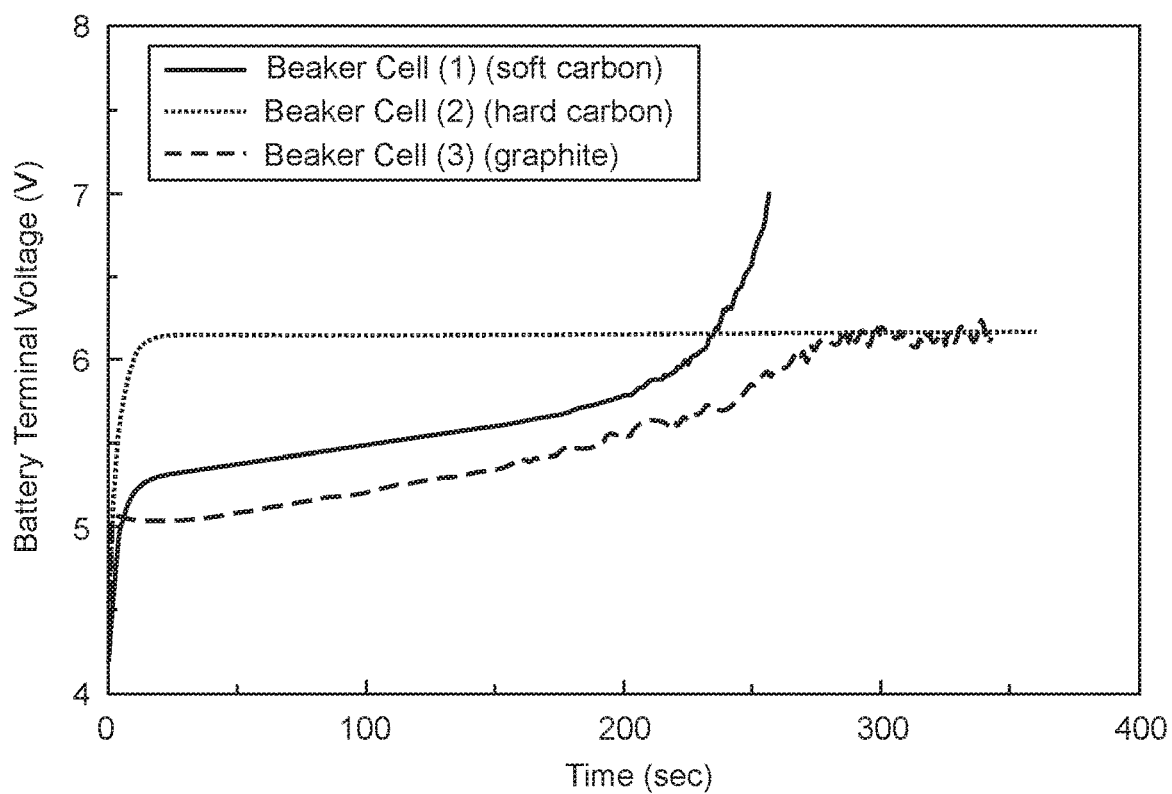

[FIG. 12]
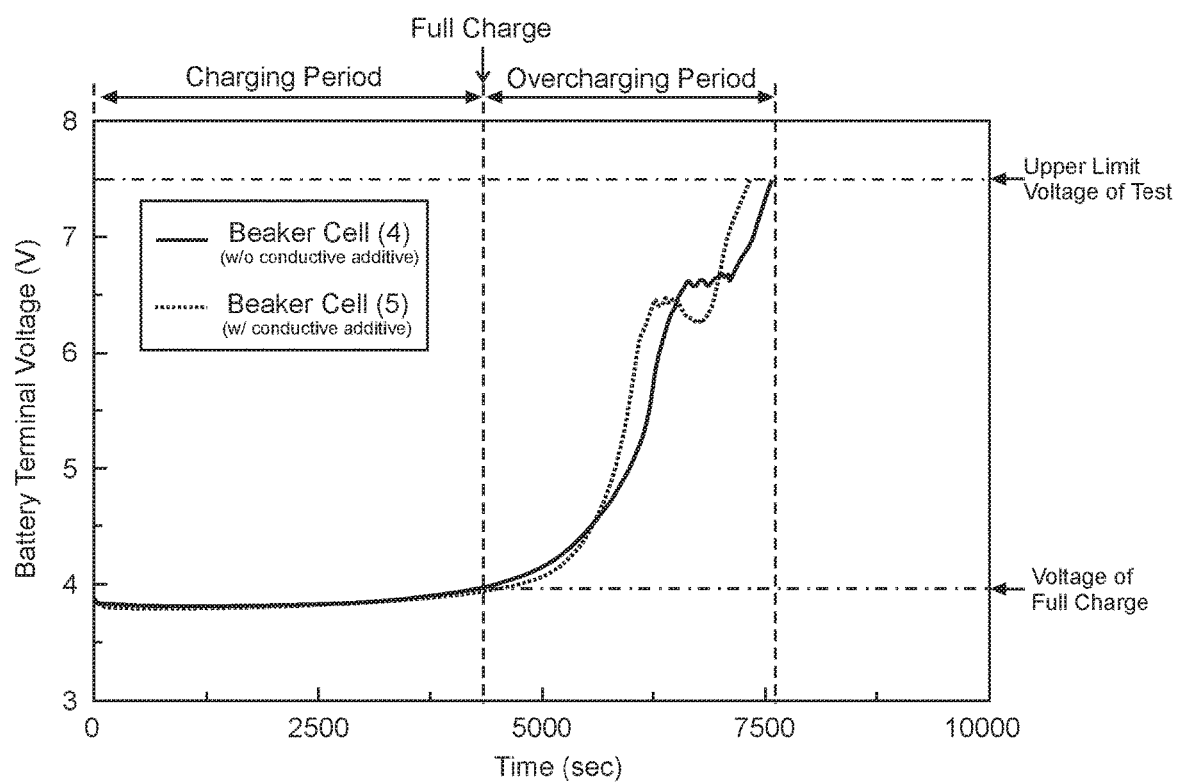

POSITIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode for non-aqueous electrolyte secondary battery, and a non-aqueous electrolyte secondary battery.

BACKGROUND ART

In recent years, non-aqueous electrolyte lithium-ion secondary batteries have been put to practical use as small lightweight batteries that have a large capacity and can be charged/discharged.

Lithium-ion secondary batteries in general use a non-aqueous electrolyte in which a lithium salt as an electrolyte is dissolved in a non-aqueous solvent.

Since such non-aqueous electrolytes are combustible materials, traditional batteries are provided with safety mechanisms such as a safety valve and a separator.

Such a battery is configured such that if the battery experiences abnormal conditions such as being overcharged and generating heat, its safety valve bursts to let an increased internal pressure in the battery escape so as to prevent explosion of the battery.

The battery is also configured such that if the battery experiences the abnormal conditions such as being overcharged and generating heat, and the battery reaches a temperature on the order of 120° C., fine pores of the separator are closed (shut down) so as to prevent any worse conditions by closing a conducting path for conducting ions in the battery.

It has been known that a positive-electrode active material comprises olivine-based inorganic particles whose surfaces are coated with a carbonaceous coating (see, for example, PTL 1). Generally, a positive-electrode active material layer is formed by mixing the positive-electrode active material, a conductive additive such as acetylene black, and a binder. The positive-electrode active material layer contains a carbon material as the carbonaceous coating or the conductive additive.

The carbon material can be generally classified as a material having a certain crystal structure such as graphite or fullerene or as an amorphous carbon (microcrystalline carbon). The amorphous carbon can be generally classified as a graphitizable carbon (soft carbon) or a non-graphitizable carbon (hard carbon).

The graphitizable carbon is a carbon material that is easy to become graphite by being treated with a high temperature. Generally, the graphitizable carbon is an amorphous carbon in which basic structural units (BSU) are clustered; and the basic structural units form an orientation texture in which the basic structural units are oriented. The basic structural unit is a structural unit in which carbon hexagonal planes are layered, and has a microscopic graphite-like structure. Generally, carbon materials formed by treating pitches with heat, graphitizable cokes, and so forth are classified as the graphitizable carbon (see, for example, PTL 2).

The non-graphitizable carbon is a carbon material whose graphitizing process is slow when being treated with a high temperature. Generally, the non-graphitizable carbon is an amorphous carbon in which basic structural units are clustered; and the basic structural units form a non-orientation texture in which the basic structural units are not oriented. Generally, carbon materials obtained by treating thermosetting resins with heat, carbon black, non-graphitizable cokes, carbon materials obtained by treating plant materials with heat, and so forth are classified as the non-graphitizable carbon (see, for example, PTL 2).

CITATION LIST

Patent Literatures

PTL 1: Japanese Unexamined Patent Application Publication No. 2015-65134
PTL 2: Japanese Unexamined Patent Application Publication No. 2015-070032

SUMMARY OF INVENTION

Technical Problems

In the safety mechanism having the traditional structure, the electrolyte inside the battery comes to a boil due to the heat generated by the overcharged battery, causing the safety valve of the battery to open. The open safety valve thus allows the electrolyte of the battery to blow out, possibly causing harmful effects on nearby equipment.

In the other mechanism for interrupting the abnormal conditions caused by the overcharged battery, including the method for closing the conducting path for the conducting ions of the separator by using the heat, materials to be used for the separator are limited. In addition, if the heat is overly generated, the separator can not possibly prevent a short circuit between the positive electrode and the negative electrode by, for example, shrinking the entire separator; and thus the separator may not function as an interruptor of the abnormal conditions.

While the batteries are increasingly required to have protection functions in case they are overcharged, a safety mechanism is necessary in addition to the protection functions such as the safety valve and the separator.

The present invention was devised in view of such circumstances, and provides a positive electrode for non-aqueous electrolyte secondary battery, having novel overcharge protection functions.

Solutions to Problems

The present invention provides a positive electrode for non-aqueous electrolyte secondary battery, comprising a carbon layer and a positive-electrode active material layer provided on the carbon layer, wherein the positive electrode is characterized in that the carbon layer includes graphitizable carbon.

Advantageous Effects of Invention

Due to the positive-electrode active material layer, the positive electrode for non-aqueous electrolyte secondary battery of the present invention allows the progression of electrode reactions (for example, an intercalation of ions into the positive-electrode active material and a deintercalation of the ions from the positive-electrode active material) of the positive-electrode active material at a time of the charging/discharging; and the non-aqueous electrolyte secondary battery can be charged/discharged.

The positive-electrode active material layer is provided on the carbon layer, and this allows a conducting distance between the carbon layer and the positive-electrode active material to be shorter; and this expedites a transfer of electrons involving electrode reactions. The carbon layer can also function as an electron-conducting path.

Since the carbon layer contains the graphitizable carbon (soft carbon), the carbon layer can have a high conductivity at the time of the charging/discharging of the battery; and when the non-aqueous electrolyte secondary battery is overcharged, the carbon layer can become highly resistive. It became evident from experiments the inventors carried out that the graphitizable carbon exhibits a high conductivity at the time of the charging/discharging of the battery and that the graphitizable carbon exhibits a high resistivity at the time when the battery is overcharged. Although the reason therefor is uncertain, it is likely that the graphitizable carbon is electrochemically resolved or becomes reactive, and changes its quality due to high potentials of the positive electrode by the overcharging.

This enables the carbon layer functioning as the electron-conducting path to be highly resistive at the time when the non-aqueous electrolyte secondary battery is overcharged, and also allows a charging current flowing through the battery to rapidly decrease at the time when the battery is overcharged. This can prevent heat caused by electrochemical reactions of the electrolyte and heat caused by the current flowing through the positive-electrode active material layer, and can also prevent the battery to have a high temperature, and can also prevent the electrolyte to come to a boil. As a result, this can prevent an increase in an internal pressure in the battery caused by the overcharged battery, and also can prevent explosion of the battery. Therefore, the positive electrode of the present invention can be used to prepare the battery comprising the positive-electrode active material layer having the enhanced safety mechanism.

This also makes it possible to prepare the battery by using the separator that is free of a shutdown mechanism, improving heat resistance of the battery. Moreover, this also makes it possible for a protection circuit to be simplified. Furthermore, this makes it possible for large-capacity batteries to improve their safety.

BRIEF DESCRIPTION OF DRAWINGS

FIG. 1(a) illustrates a diagrammatic plan view of a positive electrode for non-aqueous electrolyte secondary battery in accordance with one embodiment of the present invention, and FIG. 1(b) illustrates a diagrammatic cross-section view of the positive electrode taken along the dashed line A-A of FIG. 1(a).

FIG. 2(a) illustrates a diagrammatic plan view of a positive electrode for non-aqueous electrolyte secondary battery in accordance with one embodiment of the present invention, and FIG. 2(b) illustrates a diagrammatic cross-section view of the positive electrode taken along the dashed line B-B of FIG. 2 (a).

FIG. 3 illustrates an enlarged cross-section view of a positive-electrode active material layer included in a positive electrode for non-aqueous electrolyte secondary battery in accordance with one embodiment of the present invention.

FIG. 4 illustrates a diagrammatic cross-section view of a non-aqueous electrolyte secondary battery in accordance with one embodiment of the present invention.

FIG. 5(a) illustrates a diagrammatic plan view of a negative electrode included in a non-aqueous electrolyte secondary battery in accordance with one embodiment of the present invention, and FIG. 5(b) illustrates a diagrammatic cross-section view of the negative electrode taken along the dashed line B-B of FIG. 5(a).

FIG. 6 illustrates a diagrammatic structural view of a power generation element included in a non-aqueous electrolyte secondary battery in accordance with one embodiment of the present invention.

FIG. 7(a) illustrates an explanatory diagram of a microscopic texture of a graphitizable carbon, and FIG. 7(b) illustrates an explanatory diagram of a microscopic texture of a non-graphitizable carbon.

FIGS. 8(a) and 8(b) respectively show graphs indicating results of an overcharging test (1).

FIGS. 9(a) and 9(b) respectively show graphs indicating results of the overcharging test (1).

FIG. 10 illustrates a diagrammatic cross-section view of a beaker cell.

FIG. 11 shows a graph indicating results of applied voltage experiments.

FIG. 12 shows a graph indicating results of an overcharging test (2).

DESCRIPTION OF EMBODIMENTS

A positive electrode for non-aqueous electrolyte secondary battery according to the present invention comprises a carbon layer and a positive-electrode active material layer provided on the carbon layer, the positive electrode being characterized in that the carbon layer includes graphitizable carbon.

It is desirable that the carbon layer included in the positive electrode according to the present invention contains a graphitizable carbon that is an amorphous carbon in which basic structural units are clustered, wherein the basic structural units form an orientation texture in which the basic structural units are oriented; and each of the basic structural units has a structure in which carbon hexagonal planes are layered. This allows the carbon layer to become highly resistive and can prevent heat from being generated in the positive-electrode active material layer at a time when the non-aqueous electrolyte secondary battery is overcharged.

It is desirable that the carbon layer contains a graphitizable carbon that is a pitch-based carbon material (calcinated product of the pitch). This allows the carbon layer to become highly resistive and can prevent heat from being generated in the positive-electrode active material layer at a time when the non-aqueous electrolyte secondary battery is overcharged.

It is desirable that the carbon layer contains the graphitizable carbon that is 1.8 g/cm$^3$ or higher to 2.1 g/cm$^3$ or lower in material density. This allows the carbon layer to become highly resistive and can prevent heat from being generated in the positive-electrode active material layer at a time when the non-aqueous electrolyte secondary battery is overcharged.

It is desirable that the carbon layer contains 90 wt % or more of the graphitizable carbon. This allows the carbon layer to have a high conductivity at a time when the battery is charged/discharged and to become highly resistive at a time when the non-aqueous electrolyte secondary battery is overcharged.

It is desirable that the positive electrode according to the present invention comprises a positive-electrode current collector sheet and that the carbon layer is provided between the positive-electrode current collector sheet and the positive-electrode active material layer. This allows the carbon layer to function as an electron-conducting path between the positive-electrode current collector sheet and the positive-electrode active material layer. This also allows the carbon layer as the electron-conducting path to become highly resistive while the non-aqueous electrolyte secondary battery is overcharged, reducing an amount of a current flowing between the positive-electrode current collector sheet and the positive-electrode active material layer. This allows the internal resistance of the positive electrode to increase and can suppress an evolution of heat in the positive-electrode active material layer.

It is desirable that the carbon layer is provided so that the carbon layer comes in contact with both the positive-electrode active material layer and the positive-electrode current collector sheet and that the positive-electrode active material layer is provided so that the positive-electrode active material layer does not substantially come in contact with the positive-electrode current collector sheet. This allows the carbon layer to become highly resistive while the non-aqueous electrolyte secondary battery is overcharged, reducing an amount of a current flowing between the positive-electrode current collector sheet and the positive-electrode active material layer.

It is desirable that the carbon layer is a porous layer including graphitizable carbon particles and a binder. This allows a contact area between the graphitizable carbon particles and the non-aqueous electrolyte to be wider and allows the graphitizable carbon particles and the non-aqueous electrolyte to electrochemically react with each other in the wider area at a time when the battery is overcharged. This allows the carbon layer to become highly resistive.

It is desirable that the positive-electrode active material layer includes positive-electrode active material particles coated with a carbonaceous coating, and a binder. This allows the carbonaceous coating to function as an electron-conducting path and expedites a transfer of electrons involving electrode reactions. This allows battery characteristics to improve. Furthermore, this makes it possible for the positive-electrode active material particles to use a material with a relatively low conductivity.

It is desirable that the carbon layer included in the positive electrode according to the present invention does not substantially include a non-graphitizable carbon (hard carbon) and graphite. This allows the carbon layer to become highly resistive while the non-aqueous electrolyte secondary battery is overcharged, and can suppress a heat generation from the overcharged battery.

The present invention also provides a non-aqueous electrolyte secondary battery comprising the positive electrode of the present invention; a negative electrode including a negative-electrode active material; a separator sandwiched between the positive electrode and the negative electrode; a non-aqueous electrolyte; and a battery case housing the positive electrode, the negative electrode, the separator, and the non-aqueous electrolyte.

In the non-aqueous electrolyte secondary battery according to the present invention, the carbon layer becomes highly resistive at a time when the non-aqueous electrolyte secondary battery is in the overcharging state; and the battery is prevented from having a high temperature. This can prevent an increase in an internal pressure in the battery caused by the overcharged battery, and also can prevent explosion of the battery.

In the secondary battery according to the present invention, it is desirable that the negative-electrode active material is a carbon material; it is also desirable that the non-aqueous electrolyte is an electrolyte in which a lithium salt is dissolved in a non-aqueous solvent; and it is also desirable that the carbon layer includes a graphitizable carbon that is electrochemically resolved or reactive and becomes highly resistive at a time of the overcharging. This allows the carbon layer to become highly resistive at the time when the non-aqueous electrolyte secondary battery is overcharged, preventing the battery from having a high temperature. This can also prevent an increase in internal pressure of the battery caused by the overcharging and can prevent explosion of the battery.

In the following, one embodiment of the present invention will be described through the use of drawings. Note that compositions indicated in the drawings and the following descriptions are exemplifications and are not to limit the scope of the present invention only to the drawings and the following descriptions.

FIG. 1(a) illustrates a diagrammatic plan view of a positive electrode for non-aqueous electrolyte secondary battery in accordance with the present embodiment, and FIG. 1(b) illustrates a diagrammatic cross-section view of the positive electrode taken along the dashed line A-A of FIG. 1(a). FIG. 2(a) illustrates a diagrammatic plan view of a positive electrode for non-aqueous electrolyte secondary battery in accordance with the present embodiment, and FIG. 2(b) illustrates a diagrammatic cross-section view of the positive electrode taken along the dashed line B-B of FIG. 2(a). FIG. 3 illustrates an enlarged cross-section view of a positive-electrode active material layer included in a positive electrode in accordance with the present embodiment. FIG. 4 illustrates a diagrammatic cross-section view of a non-aqueous electrolyte secondary battery in accordance with the present embodiment. FIG. 5(a) illustrates a diagrammatic plan view of a negative electrode included in a non-aqueous electrolyte secondary battery in accordance with the present embodiment, and FIG. 5(b) illustrates a diagrammatic cross-section view of the negative electrode taken along the dashed line B-B of FIG. 5(a). FIG. 6 illustrates a diagrammatic structural view of a power generation element included in a non-aqueous electrolyte secondary battery in accordance with the present embodiment.

A positive electrode for non-aqueous electrolyte secondary battery 5 in accordance with the present embodiment comprises a carbon layer 2 and a positive-electrode active material layer 1 provided on the carbon layer 2, the positive electrode being characterized in that the carbon layer 2 includes a graphitizable carbon.

A non-aqueous electrolyte secondary battery 30 in accordance with the present embodiment comprises the positive electrode 5 of the present embodiment; a negative electrode 32 having a negative-electrode active material; a separator 34 sandwiched between the positive electrode 5 and the negative electrode 32; a non-aqueous electrolyte 15; and a battery case 11 housing the positive electrode 5, the negative electrode 32, the separator 34, and the non-aqueous electrolyte 15.

In the following, the positive electrode for non-aqueous electrolyte secondary battery 5 and the non-aqueous electrolyte secondary battery 30 in accordance with the present embodiment will be described.

1. Positive Electrode for Non-Aqueous Electrolyte Secondary Battery

The positive electrode for non-aqueous electrolyte secondary battery 5 constitutes the non-aqueous electrolyte secondary battery 30 or is used to prepare the non-aqueous electrolyte secondary battery 30.

The positive electrode for non-aqueous electrolyte secondary battery 5 comprises the carbon layer 2 and the positive-electrode active material layer 1 provided on the carbon layer 2. The positive electrode 5 can also comprise a positive-electrode current collector sheet 3, and the carbon layer 2 and the positive-electrode active material layer 1 can be provided on the positive-electrode current collector sheet 3. The carbon layer 2 can be provided between the positive-electrode current collector sheet 3 and the positive-electrode active material layer 1. The carbon layer 2 can also be provided in such a way as to come in contact with both the positive-electrode active material layer 1 and the positive-electrode current collector sheet 3. The positive-electrode active material layer 1 can also be provided in such a way as not to substantially come in contact with the positive-electrode current collector sheet 3. This enables the carbon layer 2 to function as an electron-conducting path.

The positive electrode 5 can have a structure, for example, as illustrated in FIG. 1(a) and FIG. 1(b). The positive-electrode current collector sheet 3 may be, for example, a metal foil such as an aluminum foil.

The carbon layer 2 may function as a positive-electrode current collector sheet. In this case, the positive electrode 5 can have a structure, for example, as illustrated in FIG. 2(a) and FIG. 2(b).

The positive-electrode active material layer 1 may be a porous layer including positive-electrode active material particles 6 and a binder. The positive-electrode active material layer 1 may include a conductive additive 7. Each of the positive-electrode active material particles 6 may be coated with a carbonaceous coating 8. This enables the conductive additive 7 or the carbonaceous coating 8 to function as an electron-conducting path. Used for the carbonaceous coating 8 or the conductive additive 7 may be any substances that have been traditionally used; and among those, a graphitizable carbon (soft carbon) is preferable. For example, the positive-electrode active material layer 1 can have a microstructure as illustrated in FIG. 3. Such a positive-electrode active material layer 1 can be formed by, for example, mixing positive-electrode active material powder that forms the carbonaceous coating 8, the conductive additive 7, and the binder to prepare a paste and then coating the carbon layer 2 with this paste. Examples of a solvent used to prepare the paste include dimethylformamide, N-methylpyrrolidone, isopropanol, and toluene.

The carbonaceous coating 8 can be formed in such a manner that an organic compound-containing coating layer is formed on a surface of the positive-electrode active material particles 6, and this coating layer is subjected to a heat treatment in a non-oxidizing atmosphere and carbonized. The organic compound may be a petroleum pitch or a coal pitch. This allows a pitch-based carbon material (calcinated product of the pitch) as the graphitizable carbon to be used for the carbonaceous coating 8. The heat treatment can be carried out, for example, at 500° C. or higher to 1,000° C. or lower.

Examples of the conductive additive 7 include acetylene black, furnace black, and carbon black. Another example to be used for the conductive additive 7 is a coke-based soft carbon, which is the graphitizable carbon.

The carbon layer 2 includes the graphitizable carbon (soft carbon). The carbon layer 2 can also contain 90 wt % or more of the graphitizable carbon. The carbon layer 2 may be, for example, a porous carbon layer containing carbon particles, which are a graphitizable carbon, and a binder. This allows a contact area between the carbon particles and the non-aqueous electrolyte to be wider.

Such a carbon layer 2 can be formed by, for example, mixing the carbon powder of the graphitizable carbon and the binder to prepare a paste and then coating the positive-electrode current collector sheet 3 with this paste. The carbon particles contained in the carbon layer 2 may be substantially all the graphitizable carbon. The carbon particles contained in the carbon layer 2 may be the calcinated product of the pitch (the pitch-based carbon material). It is preferable that a size of the carbon powder of the graphitizable carbon included in the carbon layer 2 is as small as possible; and its average particle diameter is preferably, for example, 1 μm or less. Too large average particle diameter may cause the carbon layer 2 to be deformed instead of being flat and smooth.

It is preferable that the carbon layer 2 is 1 μm or more to 5 μm or less in thickness. More preferably, its thickness is 3 μm or less. A thick carbon layer 2 may cause some effect on a thickness of the positive electrode 5, and a thin carbon layer may cause the formation of some pinhole.

Used as the carbon powder of the graphitizable carbon may be, for example, a coke-based soft carbon.

In applied voltage experiments to be described below, it became clear that the graphitizable carbon becomes highly conductive when the battery is charged/discharged; and when the battery is in an overcharged state, its resistance is increased. Therefore, the graphitizable carbon-containing carbon layer 2 having the positive-electrode active material layer 1 provided thereon enables a conducting distance between the carbon layer 2 and the positive-electrode active material particles 6 to be shorter when the non-aqueous electrolyte secondary battery 30 is charged/discharged; and this expedites a transfer of electrons involving electrode reactions (for example, an intercalation of ions into the positive-electrode active material and a deintercalation of the ions from the positive-electrode active material). Also, when the non-aqueous electrolyte secondary battery 30 is overcharged, the carbon layer 2 develops high resistance, allowing a charging current flowing in the battery 30 in the overcharged state to promptly decrease. This can suppress an evolution of heat involving an electrochemical reaction of the electrolyte 15 and an evolution of heat involving the current flowing into the carbonaceous coating 8 or the conductive additive 7; also can prevent the battery 30 to generate a high temperature; and also can prevent the electrolyte 15 to come to a boil. As a result, this can prevent an increase of an internal pressure in the battery 30 caused by the overcharging of the battery, and can prevent explosion of the battery 30.

The graphitizable carbon (soft carbon) is a carbon material that is easy to become graphite by the high-temperature treatment. Furthermore, the graphitizable carbon is an amorphous carbon in which basic structural units 10 (BSU) are clustered (aggregated) to become a microscopic texture as illustrated in FIG. 7(a) as an example; and the basic structural units 10 form an orientation texture in which the basic structural units are oriented. The basic structural unit 10 is a structural unit in which carbon hexagonal planes 4 are layered, and has a microscopic graphite-like structure. The basic structural units 10 each may be crystallite. Therefore, it can be verified by observing the carbon layer 2, etc. with the use of a transmission electron microscope or by means of an X-ray diffraction measurement or a Raman spectrum measurement whether or not the carbon layer includes a graphitizable carbon.

Generally, carbon materials obtained by heat-treating pitches, such as petroleum pitch and coal pitch, graphitizable cokes, etc. are classified as graphitizable carbon. Therefore, it can be also verified by testing raw materials of the carbon particles included in the carbon layer 2 and heat-treatment temperatures whether or not the carbon layer includes a graphitizable carbon.

The carbon particles included in the carbon layer 2 may have a material density of 1.8 g/cm³ or higher to 2.1 g/cm³ or lower. Generally, graphitizable carbon has a higher material density than non-graphitizable carbon; therefore, it can be verified by testing a material density whether or not the carbon particles are a graphitizable carbon.

Meanwhile, the non-graphitizable carbon (hard carbon) is a carbon material whose graphitizing process is slow when being subjected to a high-temperature treatment. The non-graphitizable carbon is an amorphous carbon in which basic structural units 10 (BSU) are clustered to become a microscopic texture as illustrated in FIG. 7(b) as an example; and the basic structural units 10 form a non-orientation texture in which the basic structural units are not oriented. Generally, carbon materials obtained by treating thermosetting resins with heat, carbon black, non-graphitizable cokes, carbon materials obtained by treating plant materials with heat, and so forth are classified as a non-graphitizable carbon.

In applied voltage experiments to be described below, it became clear that the non-graphitizable carbon and the graphite do not develop high resistance when the battery is in an overcharged state.

The positive-electrode active material particles 6 may be particles of substances having an olivine-type crystal structure (olivine-type compounds). Examples of the olivine-type compounds include $LiFePO_4$ and $Li_xM_yPO_4$ (wherein $0.05 \leq x \leq 1.2$, $0 \leq y \leq 1$, M is at least one kind selected from Fe, Mn, Cr, Co, Cu, Ni, V, Mo, Ti, Zn, Al, Ga, Mg, B, and Nb).

The positive-electrode active material particles 6 may be particles of NASICON-type compounds that can be represented by $Y_xM_2(PO_4)_3$. The NASICON-type compound has a rhombohedral crystal; and examples of the NASICON-type compounds include $Li_{3+x}Fe_2(PO_4)_3$, $Li_{2+x}FeTi(PO_4)_3$, $Li_xTiNb(PO_4)_3$, and $Li_{1+x}FeNb(PO_4)_3$.

The positive-electrode active material particles 6 may also be particles of lithium transition-metal composite oxides (layered type, spinel, etc.) that can reversibly extract and/or insert lithium ions.

In addition, the positive-electrode active material layer 1 may include one kind of the above-described positive-electrode active material particles 6 alone or may include two or more kinds of the above-described positive-electrode active material particles 6.

The positive-electrode active material particles 6 may also be particles of sodium transition-metal composite oxides. For example, the positive-electrode active material particles 6 may be particles of an oxide represented by $Na_bM^2_cSi_{12}O_{30}$ (wherein $M^2$ is one or more kinds of transition metal elements, $2 \leq b \leq 6$, and $2 \leq c \leq 5$) such as $Na_6Fe_2Si_{12}O_{30}$ or $Na_2Fe_5Si_{12}O_{30}$; particles of an oxide represented by $Na_dM^3_eSi_6O_{18}$ (wherein $M^3$ is one or more kinds of transition metal elements, $3 \leq d \leq 6$, and $1 \leq e \leq 2$) such as $Na_2Fe_2Si_6O_{18}$ or $Na_2MnFeSi_6O_{18}$; particles of an oxide represented by $Na_fM^4_gSi_2O_6$ (wherein $M^4$ is one or more elements selected from the group of transition metal elements, Mg, and Al; $1 \leq f \leq 2$; and $1 \leq g \leq 2$) such as $Na_2FeSiO_6$; particles of a phosphate such as $NaFePO_4$ or $Na_3Fe_2(PO_4)_3$; particles of a borate such as $NaFeBO_4$ or $Na_3Fe_2(BO_4)_3$; and particles of a fluoride represented by $Na_hM^5F_6$ (wherein $M^5$ is one or more transition metal elements, and $2 \leq h \leq 3$) such as $Na_3FeF_6$ or $Na_2MnF_6$.

In addition, the positive-electrode active material layer 1 may include one kind of the above-described positive-electrode active material particles 6 alone or may include two or more kinds of the above-described positive-electrode active material particles 6.

Examples of the binder included in the positive-electrode active material layer 1 include polyvinylidene fluoride (PVdF), polytetrafluoroethylene (PTFE), styrene-butadiene copolymer (SBR), acrylonitrile rubber, and a mixture of acrylonitrile rubber and PTFE.

2. Non-Aqueous Electrolyte Secondary Battery

The non-aqueous electrolyte secondary battery 30 comprises the positive electrode 5; the negative electrode 32; the separator 34 sandwiched between the positive electrode 5 and the negative electrode 32; the non-aqueous electrolyte 15; and the battery case 11 housing the positive electrode 5, the negative electrode 32, the separator 34, and the non-aqueous electrolyte 15. Examples of the non-aqueous electrolyte secondary battery 30 include a lithium-ion secondary battery and a sodium-ion secondary battery.

The non-aqueous electrolyte secondary battery 30 comprises the positive electrode for non-aqueous electrolyte secondary battery 5. Since the positive electrode for non-aqueous electrolyte secondary battery 5 has been described above, the description thereof is omitted here. The positive electrode 5 can compose a power generation element 22 as illustrated in FIG. 6 together with the negative electrode 32 and the separator 34.

The negative electrode 32 includes a porous negative-electrode active material layer 36 containing a negative-electrode active material. The negative electrode 32 can also include a negative-electrode current collector sheet 38.

The negative-electrode active material layer 36 can contain the negative-electrode active material, a conductive additive, a binder, and so forth.

Examples of the negative-electrode active material include graphite (black lead), partially graphitized carbon, hard carbon, soft carbon, $LiTiO_4$, Sn, and Si. The negative-electrode active material layer 36 may contain one kind of the above-described negative-electrode active materials alone or may contain two or more kinds of the above-described negative-electrode active materials.

The negative-electrode active material layer 36 can be provided on the negative-electrode current collector sheet 38. The negative-electrode active material layer 36 can be provided on both main surfaces of the negative-electrode current collector sheet 38 of the negative electrode 32, for example, as illustrated in FIG. 5(a) and FIG. 5(b).

The separator 34 is in the form of a sheet, and is placed between the positive electrode 5 and the negative electrode 32. The separator 34 can constitute the power generation element 22 as illustrated in FIG. 6 together with the positive electrode 5 and the negative electrode 32. The separator 34 placed therebetween can prevent a short-circuit current from flowing between the positive electrode 5 and the negative electrode 32. The separator 34 is not particularly limited, so long as it can prevent a short-circuit current from flowing and transmit ions that are conducted between the positive electrode and the negative electrode. Used as the separator may be, for example, a microporous polyolefin film, a cellulose sheet, or an aramid sheet.

The battery case 11 contains the positive electrode 5, the negative electrode 32, the separator 34, and the non-aqueous electrolyte 15. The battery case 11 may also have an opening closed with a lid 12. This enables the battery case 11 to contain the power generation element 22 therein.

The non-aqueous electrolyte 15 is contained in the battery case 11 to serve as an ion conduction medium between the positive electrode and the negative electrode. In addition, the non-aqueous electrolyte 15 includes a non-aqueous solvent and an electrolyte salt dissolved in the non-aqueous solvent.

Examples of the usable non-aqueous solvent contained in the non-aqueous electrolyte 15 include carbonate compounds (cyclic carbonate compounds, chain carbonate compounds, etc.), lactone, ether, and ester; and two or more kinds of these solvents can be used as a mixture. Among these, especially a solvent prepared by mixing the cyclic carbonate compound and the chain carbonate compound is preferable.

Examples of the electrolyte salt contained in the non-aqueous electrolyte 15 include $LiCF_3SO_3$, $LiAsF_6$, $LiClO_4$, $LiBF_4$, $LiPF_6$, LiBOB, $LiN(CF_3SO_2)_2$, and $LiN(C_2F_5SO_2)$.

The non-aqueous electrolyte 15 may also be blended with an additive such as a flame retardant, as needed.

Preparation Method of Lithium-Ion Secondary Batteries

A positive electrode (1) was prepared that comprises a carbon layer containing carbon powder of a coke-based soft carbon, which was a graphitizable carbon; and a positive electrode (2) was prepared that comprises a carbon layer containing carbon powder of acetylene black. The both positive electrodes were prepared so as to comprise the same components except the component of the carbon layer. The positive electrodes were prepared specifically as follows.

Carbon powder and polyvinylidene fluoride (PVDF $((CH_2CF_2)_n)$) (binder) were mixed in such a way that the carbon powder has a content of 94 wt % and the PVDF has a content of 6 wt % with respect to 100 wt % of their total content. To this mixed powder, N-methylpyrrolidone was added and kneaded, preparing a carbon paste. This carbon paste was applied to an aluminum foil (positive-electrode current collector sheet), forming a coating film; and a carbon layer having a thickness of about 2 μm was formed on the positive-electrode current collector sheet by drying the coating film. Used as the carbon powder of the coke-based soft carbon was KANJ-9 (manufactured by MT Carbon Co., Ltd.) (about 0.5 μm in average particle diameter). Used as the carbon powder of acetylene black was acetylene black manufactured by Denka Company Limited.

Lithium iron phosphate ($LiFePO_4$) powder (positive-electrode active material powder) having a carbonaceous coating, acetylene black (conductive additive), and polyvinylidene fluoride (PVDF $((CH_2CF_2)_n)$) (binder) were mixed in such a way that the positive-electrode active material powder has a content of 88 to 95 wt % and the conductive additive has a content of 3.5 to 4.5 wt % with respect to 100 wt % of a total content of components. To this mixed powder, N-methylpyrrolidone was added and kneaded, preparing a positive-electrode active material paste. This positive-electrode active material paste was applied to the carbon layer, forming the carbon layer and a positive-electrode active material layer on the positive-electrode current collector sheet by drying the coating film, with the result that a positive electrode (1) and a positive electrode (2) were prepared. Used as the lithium iron phosphate powder was the one manufactured by Sumitomo Osaka Cement Co., Ltd.

By using the positive electrode (1), a lithium-ion secondary battery (1) was prepared; and by using the positive electrode (2), a lithium-ion secondary battery (2) was prepared. The both batteries were prepared so as to comprise the same components except the positive electrode. The batteries were prepared specifically as follows.

The lithium-ion secondary batteries (1) and (2) were prepared, each of which comprises a battery case having a lid with a safety valve and containing a power generation element where the positive electrode (1) or the positive electrode (2); a separator made of a polyolefin (having a shutdown temperature in the vicinity of 120° C.); and a carbonaceous negative electrode are layered in a multilayer fashion, the battery case containing a non-aqueous electrolyte injected thereinto. Used as the non-aqueous electrolyte was a 1 M $LiPF_6$ electrolyte including a carbonate-based solvent (EC:DEC:EMC=1:1:1), an additive (containing 1 part by weight of VC and 1 part by weight of FEC with respect to 100 parts by weight of the electrolyte), and $LiPF_6$ which was an electrolyte. The lithium-ion secondary batteries (1) and (2) each were prepared so as to have a capacity of 50 Ah.

Overcharging Test (1) The lithium-ion secondary batteries (1) and (2) thereby prepared were subjected to an overcharging test. The test was carried out specifically as follows.

The batteries were fully charged with a charging current of 50 A and an upper limit voltage of 3.5 V for 6 hours, and were subjected to the overcharging test. In the overcharging test, a charging current was 50 A, i.e. 1 ItA (1 CA), and an upper limit voltage of test was 10 V to carry out CCCV (Constant-Current-Constant-Voltage) charging. In the overcharging test, a voltage between an external connector of the positive electrode and an external connector of the negative electrode and a current flowing between these external connectors were measured. In the overcharging test, a temperature was also measured by means of a thermocouple installed in the battery case.

Test results thereby obtained will be shown in Table 1.

TABLE 1

|  | Safety valve after the overcharging | Increase in temperature during the overcharging | Maximum temperature during the overcharging |
|---|---|---|---|
| Battery (1) | Closed | 35.0° C. | 58.2° C. |
| Battery (2) | Open | 92.1° C. | 113.5° C. |

The results of the overcharging test on the lithium-ion secondary battery (1) are shown in FIG. 8, and the results of the overcharging test on the lithium-ion secondary battery (2) are shown in FIG. 9. FIGS. 8 and 9 use the horizontal axis to indicate a test duration in which a time point where the overcharging test started is indicated as 0 minute.

The battery (2) exhibited, as indicated by a voltage curve shown in FIG. 9(a), that its voltage between the positive electrode and the negative electrode went up to about 5.5 V and then became almost constant while the battery was charged in the overcharged state. About 12 minutes after the start of the overcharging, the voltage rose sharply; and in the vicinity of 13 minutes, the voltage between the positive electrode and the negative electrode reached the upper limit voltage of test.

The battery (2) exhibited, as indicated by a current curve shown in FIG. 9(b), that its current between the positive electrode and the negative electrode decreased sharply in the vicinity of 13 minutes, and then the current hardly flowed. It was observed that the safety valve of the battery (2) was opened, and the electrolyte in the battery case outflowed.

Since the battery (2) exhibited in 12 to 13 minutes after the start of the overcharging that its voltage between the positive electrode and the negative electrode increased sharply and its current decreased sharply, it was likely that a temperature inside the battery reached 120° C. or higher, causing shutdown of the fine pores of the separator and closure of the conducting path for the conducting ions in the battery.

The battery (1) exhibited, as indicated by a voltage curve shown in FIG. 8(a), that its voltage between the positive electrode and the negative electrode increased gradually and then reached the upper limit voltage of test in the vicinity of 6 minutes of the test time while the battery was charged in the overcharged state. It was found that the voltage of this battery increased more moderately than the voltage of the battery (2).

The battery (1) exhibited, as indicated by a current curve shown in FIG. 8(b), that when the voltage between the positive electrode and the negative electrode reached the upper limit voltage of test in the vicinity of 6 minutes, the current flowing between the positive electrode and the negative electrode decreased gradually; and then the current hardly flowed in 10 to 12 minutes of the test time. Its phenomenon was different from the one that occurred at the time of the shutdown of the separator in which the current flow ceased suddenly. It was found that the safety valve of the battery (1) never opened.

Since the battery (1) exhibited that its voltage between the positive electrode and the negative electrode increased gradually and its current flowing between the positive electrode and the negative electrode decreased gradually, it was likely that internal resistance of the battery increased gradually when the battery was in the overcharged state.

Battery Disassembly Experiments after Overcharging Tests

After the overcharging tests, the positive electrodes (1) and (2) were removed from the lithium-ion secondary batteries (1) and (2), respectively; and an electric resistivity between the positive-electrode current collector sheet and the positive-electrode active material layer of the positive electrodes (1) and (2) was measured by a four-terminal method. Also, an electric resistivity of the positive electrodes (1) and (2) prior to the assembly of the batteries was measured.

Moreover, after the overcharging tests, the separator was removed from the lithium-ion secondary batteries (1) and (2) each; and the separators were subjected to an air permeability test. Also, the separators prior to the assembly of the batteries were subjected to the air permeability test. The air permeability test was carried out by means of an air permeability tester (Gurley testing machine). This test is to measure a time required for a specified volume of air to pass through a unit area.

Test results thereby obtained will be shown in Table 2.

Meanwhile, it was found that the increase in the internal resistance of the battery (2) which had been subjected to the overcharging test was not caused by the increase in the internal resistance of the positive electrode (2).

As shown in the results in Table 2, the air permeability of the separator of the battery (1) after the overcharging test was about 1.3 times higher than the air permeability of the unused separator. Meanwhile, although the separator removed from the battery (2) after the overcharging test was measured for its air permeability, a value of the air permeability was too high and was unmeasurable.

It was found from these results of the overcharging test on the battery (1) that a temperature inside the battery did not reach the shutdown temperature of the separator. It was also found from the overcharging test on the battery (1) that the increase in the internal resistance of the battery (1) was not caused by the blockage of the fine pores of the separator.

It was found from the overcharging test on the battery (2) that a temperature inside the battery reached the shutdown temperature of the separator. It was thus likely that the fine pores of the separator were blocked and that the conducting path for the conducting ions in the battery was closed, causing the rapid increase in the voltage between the positive electrode and the negative electrode and the rapid decrease in the current.

Applied Voltage Experiments

Positive electrodes (3) to (5) were prepared that respectively have different types of carbon layers 42, and beaker cells (1) to (3) were prepared that respectively comprise the positive electrodes (3) to (5), as illustrated in FIG. 10; and the beaker cells each were subjected to an applied voltage experiment on the assumption that the beaker cells were subjected to an overcharging test. A positive electrode (3) was prepared by mixing graphitizable carbon (soft carbon) powder and a binder (PVDF) to prepare a paste and then coating an aluminum foil 41 with the paste to prepare a carbon layer 42a; and a beaker cell (1) was prepared by using this positive electrode (3). Used as the graphitizable carbon powder was KANJ-9 (manufactured by MT Carbon Co., Ltd.) which was a coke-based soft carbon.

TABLE 2

| | Electric resistivity of the positive electrode of the battery (1) | Electric resistivity of the positive electrode of the battery (2) | Air permeability of the separator of the battery (1) | Air permeability of the separator of the battery (2) |
|---|---|---|---|---|
| Prior to the assembly of the battery | 0.17 Ω·m | 0.16 Ω·m | 440 sec/100 ml | 440 sec/100 ml |
| After the overcharging test | 550 Ω·m | 9.0 Ω·m | 560 sec/100 ml | 10,000 sec/100 ml or more (unmeasurable) |

It was found from the results shown in Table 2 that the resistivity of the positive electrode (1) after the overcharging test was 500 am or higher and that this resistivity remarkably increased from the one of the positive electrode (1) prior to the assembly of the battery. On the other hand, it was found that the resistivity of the positive electrode (2) after the overcharging test was about 9 Ω·m and that the positive electrode (2) exhibited a lower increase in the resistivity.

It was found from these results that the increase in the internal resistance of the battery (1) which had been subjected to the overcharging test was caused by the increase in the internal resistance of the positive electrode (1).

In the same way as in the above, a positive electrode (4) was prepared that has a carbon layer 42b containing non-graphitizable carbon (hard carbon) powder, preparing a beaker cell (2). Used as the non-graphitizable carbon was CARBOTRON P (manufactured by Kureha Battery Materials Japan Co., Ltd.).

In the same way as in the above, a positive electrode (5) was also prepared that has a carbon layer 42c containing graphite powder, preparing a beaker cell (3). Used as the graphite powder was KGNJ-9 (manufactured by MT Carbon Co., Ltd.) which was prepared by calcining coke-based carbon.

Every one of the carbon layers 42a, 42b, and 42c thereby prepared exhibited a high conductivity.

Used as the non-aqueous electrolyte 15 was a 1 M $LiPF_6$ electrolyte including a carbonate-based solvent (EC:DEC=3:7) and $LiPF_6$ which was an electrolyte. Used for the negative electrode 32 was a metal lithium foil. In the applied voltage experiment, an upper limit voltage of test was 7 V; and a charge voltage was applied between the positive electrode and the negative electrode so that a constant current of 10 mA flowed therethrough.

Test results are shown in FIG. 11. In the beaker cell (1) comprising the positive electrode (3) having the carbon layer 42a which was the soft carbon, a terminal voltage rose to about 5.3 V in about the first 0 to 10 seconds of the test time, and then the terminal voltage gradually rose to about 6 V during the test time of about 10 to 220 seconds. After that, the terminal voltage rose rapidly and reached the upper limit voltage of test.

In the beaker cell (2) comprising the positive electrode (4) having the carbon layer 42b which was the hard carbon, a terminal voltage rose to about 6.2 V in about the first 0 to 15 seconds of the test time, and then became constant.

In the beaker cell (3) comprising the positive electrode (5) having the graphite-containing carbon layer 42c, a terminal voltage rose to about 5.0 V in about the first 0 to 2 seconds of the test time, and then gradually rose to about 6.2 V during the test time of about 2 to 275 seconds. The terminal voltage then became constant at about 6.2 V.

The terminal voltage of the beaker cell (1) reached the upper limit voltage of test. It was likely that the soft carbon became highly resistive while the terminal voltage rose from about 5.3 V to about 6 V and that the high resistivity ended when the terminal voltage went over about 6 V; and it was thus likely that the terminal voltage reached the upper limit voltage of test because the current hardly flowed through the carbon layer 42a. It was also likely that the soft carbon was oxidized with the $LiPF_6$ in the electrolyte in about the first 10 to 220 seconds of the test time.

In the beaker cell (2) comprising the positive electrode containing the hard carbon in the carbon layer 42, the hard carbon was not affected by any electrochemical reaction; and the terminal voltage kept rising and became constant at about 6.2 V.

In the beaker cell (3) comprising the positive electrode containing the graphite in the carbon layer 42, it was observed that the graphite was affected by an electrochemical reaction at about 5.0 V; however, the carbon layer 42 did not become highly resistive because the graphite has a stable structure; and the terminal voltage became constant at about 6.2 V.

It was likely that the carbonate-based solvent became electrochemically reactive within the time period where the terminal voltage was constant at about 6.2 V.

From the results of the above-described applied voltage experiments, it was likely that the increase in the internal resistance of the lithium-ion secondary battery (1) which was measured by the overcharging test (1) and the increase in the impedance of the positive electrode (1) which was measured by the battery disassembly experiment were caused by the high resistance of the soft carbon-containing carbon layer.

From the results of the above-described applied voltage experiments, it was found that the non-graphitizable carbon (hard carbon) and the graphite did not become highly resistive in the overcharged state. Since the acetylene black is the highly-graphitized carbon black, it was likely that the acetylene black also did not become highly resistive in the overcharged state. Accordingly, because the carbon layer contained the acetylene black, it was likely that the carbon layer of the lithium-ion secondary battery (2) exhibited the high conductivity during the overcharging test (1), even though the battery was overcharged and the positive electrode was high in potential. It was thus likely that the current flowed through the positive-electrode active material layer 1 via the carbon layer even in the overcharged state, and it was also likely that the electrolyte and the non-aqueous solvent contained in the non-aqueous electrolyte 15 in the positive-electrode active material layer 1 were electrochemically resolved or became reactive, causing heat. It was likely that this heat brought the electrolyte 15 to a boil and that the safety valve of the battery was opened.

Overcharging Test (2)

Positive electrodes (6) and (7) were prepared by using, as positive-electrode active material powder, lithium iron phosphate ($LiFePO_4$) powder (manufactured by Sumitomo Osaka Cement Co., Ltd.) coated with a carbonaceous coating; and beaker cells (4) and (5) were prepared that comprise the above-described positive electrodes, respectively. The cells were prepared specifically as follows.

Positive electrode (6) and beaker cell (4): A base carbon layer (conductive base layer) was prepared by mixing 94 wt % of graphitizable carbon (soft carbon) powder (about 10 mg) and 6 wt % of a binder (PVDF) to prepare a paste and then coating an aluminum foil (positive-electrode current collector sheet) with the paste. Used as the graphitizable carbon powder was KANJ-9 (manufactured by MT Carbon Co., Ltd.) (ground into about 0.5 μm in average particle diameter) which was a coke-based soft carbon.

Positive-electrode active material powder and a binder (PVDF) were mixed in such a way that the positive-electrode active material powder has a content of 95 wt % and the binder has a content of 5 wt % with respect to 100 wt % of their total content. (No conductive additive was added.) To this mixed powder, N-methylpyrrolidone was added and kneaded, preparing a positive-electrode active material paste. This positive-electrode active material paste (about 10 mg) was applied to the base carbon layer, and the positive electrode (6) was prepared by forming the base carbon layer (about 2 μm in thickness) and the positive-electrode active material layer 1 (about 200 μm in thickness) on the positive-electrode current collector sheet 3.

The beaker cell (4) was prepared by using this positive electrode (6). Used as the non-aqueous electrolyte 15 was a 1 M $LiPF_6$ electrolyte including a carbonate-based solvent (EC:DEC=3:7) and $LiPF_6$ which was an electrolyte. Used for the negative electrode 32 was a metal lithium foil. A separator was not provided thereto.

Positive electrode (7) and beaker cell (5): In the same way as in the positive electrode (6), a base carbon layer was formed on a positive-electrode current collector sheet 3.

Positive-electrode active material powder, acetylene black (conductive additive), and a binder (PVDF) were mixed in such a way that the positive-electrode active material powder has a content of 91 wt %, the conductive additive has a content of 4 wt %, and the binder has a content of 5 wt % with respect to 100 wt % of their total content. To this mixed powder, N-methylpyrrolidone was added and kneaded, preparing a positive-electrode active material paste. This positive-electrode active material paste (about 10 mg in amount) was applied to the base carbon layer, and the positive electrode (7) was prepared by forming the base carbon layer (about 2 μm in thickness) and the positive-electrode active material layer 1 (about 200 μm in thickness) on the current collector sheet 3. The positive-electrode active material layer 1 of the positive electrode (9) contains the conductive additive 7 which is the acetylene black, and the base carbon layer contains the graphitizable carbon.

The beaker cell (5) was prepared by using this positive electrode (7). Used as the non-aqueous electrolyte 15 was a 1 M LiPF$_6$ electrolyte including a carbonate-based solvent (EC:DEC=3:7) and LiPF$_6$ which was an electrolyte. Used for the negative electrode was a metal lithium foil. A separator was not provided thereto.

The beaker cells (4) and (5) each were subjected to a charging/overcharging test. In the charging/overcharging tests, an upper limit voltage of test was 7.5 V; and a charge voltage was applied between the positive electrode and the negative electrode so that a constant current of about 0.6 C flowed therethrough.

Results of the charging/overcharging tests are shown in FIG. 12.

In the test on the beaker cell (4), a terminal voltage was stable at about 3.8 V during the charging period from about 0 to 4,350 seconds.

When the cell went over a full charge state and was overcharged, the terminal voltage rose during the test time of about 4,350 to 6,520 seconds; and the terminal voltage became constant during the test time of about 6,520 to 7,140 seconds; and then the terminal voltage rose and reached the upper limit voltage of test. This confirmed that the internal resistance of the battery increased even though no separator was provided thereto.

The positive-electrode active material layer 1 of the positive electrode (6) contained in the beaker cell (4) did not include acetylene black, and the base carbon layer included the graphitizable carbon. It was likely that the graphitizable carbon was electrochemically oxidized in the overcharged state, resulting in the high resistance of the base carbon layer and the increase in internal resistance of the beaker cell (4), as shown in FIG. 12. It was also likely that the time period from about 6,520 to 7,140 seconds where the terminal voltage became constant was when the soft carbon was electrochemically oxidized.

Therefore, it was found that the graphitizable carbon contained in the base carbon layer enabled the base carbon layer to be rapidly and highly resistive in the overcharged state and was capable of preventing the current with heat from flowing through the positive-electrode active material layer 1. It was thus found that the base carbon layer containing the graphitizable carbon was capable of suppressing an evolution of heat in the battery in the overcharged state and was capable of preventing an increase of an internal pressure inside the battery, preventing explosion of the battery.

In the test on the beaker cell (5), a terminal voltage was stable at about 3.8 V during the charging period from about 0 to 4,350 seconds. When the cell went over a full charge state and was overcharged, the terminal voltage rose during the test time of about 4,350 to 6,230 seconds; and the terminal voltage decreased during the test time of about 6,230 to 6,740 seconds; and then the terminal voltage rose and reached the upper limit voltage of test. This is, however, uncertain why the terminal voltage decreased slightly during the time period from about 6,230 to 6,740 seconds.

The positive-electrode active material layer 1 of the positive electrode (7) contained in the beaker cell (5) included the acetylene black (conductive additive 7), and the base carbon layer included the graphitizable carbon. It was likely that the graphitizable carbon reacted electrochemically with the non-aqueous electrolyte 15 in the overcharged state, resulting in the high resistance of the base carbon layer and the increase in internal resistance of the beaker cell (5), as shown in FIG. 12. It was found that the graphitizable carbon-containing base carbon layer provided between the positive-electrode current collector sheet 3 and the positive-electrode active material layer 1 became highly resistive since the base carbon layer functioned as an electron-conducting path in the overcharged state, preventing the current with heat from flowing into the positive-electrode active material layer 1. It was thus found that the base carbon layer containing the graphitizable carbon was capable of suppressing an evolution of heat in the battery in the overcharged state and was capable of preventing an increase of an internal pressure inside the battery, preventing explosion of the battery.

Overcharging Test (3)

Beaker cells (6) to (9) were prepared, each of which comprises a base carbon layer containing mixed powder of a soft carbon and a hard carbon. These beaker cells were prepared in the same way as the beaker cell (5) except the base carbon layer. Used as the soft carbon was KANJ-9 (manufactured by MT Carbon Co., Ltd.) which was a coke-based soft carbon, and used as the hard carbon was CARBOTRON P (manufactured by Kureha Battery Materials Japan Co., Ltd.). Table 3 will show a mix ratio between the soft carbon and the hard carbon in each cell.

The beaker cells (6) to (9) thereby prepared were subjected to an overcharging test. In the overcharging test, an upper limit voltage of test was 7.0 V; and a charge voltage was applied between the positive electrode and the negative electrode so that a constant current of about 0.6 C flowed therethrough. In a case where a terminal voltage reached the upper limit voltage of test within a predetermined time period, it was determined that the base carbon layer became highly resistive. Test results will be shown in Table 3.

TABLE 3

|  | Beaker cell (6) | Beaker cell (7) | Beaker cell (8) | Beaker cell (9) |
| --- | --- | --- | --- | --- |
| Content of the soft carbon | 80 wt % | 85 wt % | 90 wt % | 95 wt % |
| Content of the hard carbon | 20 wt % | 15 wt % | 10 wt % | 5 wt % |
| High resistivity of the base carbon layer after the overcharging test | X | X | ◯ | ◯ |

In the tests on the beaker cells (6) and (7), the terminal voltage did not reach the upper limit voltage of test during the predetermined time period. It was likely that the base carbon layer of these cells did not become highly resistive because of having the high content of the hard carbon.

In the tests on the beaker cells (8) and (9), the terminal voltage reached the upper limit voltage of test during the predetermined time period. It was likely that the base carbon layer of these cells became highly resistive because of having the low content of the hard carbon and the high content of the soft carbon.

REFERENCE SIGNS LIST 1 positive-electrode active material layer
2 carbon layer
3 positive-electrode current collector sheet
4 carbon hexagonal plane
5 positive electrode
6 positive-electrode active material particle 7 conductive additive
8 carbonaceous coating
9 fine pore
10 basic structural unit (BSU)
11 battery case
12 lid
13 positive-electrode connecting member
14 negative-electrode connecting member
15 non-aqueous electrolyte
16a, 16b screw member
18a, 18b external connector
20a, 20b external insulating member
21a, 21b internal insulating member
22 power generation element
25 shrink film
30 non-aqueous electrolyte secondary battery
32 negative electrode
34 separator
36 negative-electrode active material layer
38 negative-electrode current collector sheet
40a, 40b clip
41 aluminum foil
42 carbon layer
43 positive electrode
45 beaker cell

What is claimed is:

1. A positive electrode for non-aqueous electrolyte secondary battery, comprising a carbon layer and a positive-electrode active material layer provided on the carbon layer, wherein the carbon layer comprises soft carbon,
   wherein the soft carbon is an amorphous carbon in which basic structural units are clustered, the soft carbon having an orientation texture in which the basic structural units are oriented, each of the basic structural units having a structure in which carbon hexagonal planes are layered, and the basic structural units being connected via an amorphous phase,
   wherein the positive electrode further comprises a positive-electrode current collector sheet, wherein the carbon layer is provided between the positive-electrode current collector sheet and the positive-electrode active material layer, and
   wherein the carbon layer is a porous layer including soft carbon particles and a binder.

2. The positive electrode according to claim 1, wherein the carbon layer comprises the soft carbon that is 1.8 g/cm$^3$ or higher to 2.1 g/cm$^3$ or lower in material density.

3. The positive electrode according to claim 2, wherein the carbon layer comprises 90 wt % or more of the soft carbon.

4. The positive electrode according to claim 1, wherein the carbon layer comprises 90 wt % or more of the soft carbon.

5. The positive electrode according to claim 4, wherein the carbon layer is provided so that the carbon layer comes in contact with both the positive-electrode active material layer and the positive-electrode current collector sheet, and
   the positive-electrode active material layer is provided so that the positive-electrode active material layer does not substantially come in contact with the positive-electrode current collector sheet.

6. The positive electrode according to claim 3, wherein the carbon layer is provided so that the carbon layer comes in contact with both the positive-electrode active material layer and the positive-electrode current collector sheet, and
   the positive-electrode active material layer is provided so that the positive-electrode active material layer does not substantially come in contact with the positive-electrode current collector sheet.

7. The positive electrode according to claim 6, wherein the positive-electrode active material layer comprises positive-electrode active material particles coated with a carbonaceous coating, and a binder.

8. A non-aqueous electrolyte secondary battery comprising:
   the positive electrode according to claim 7;
   a negative electrode including a negative-electrode active material;
   a separator sandwiched between the positive electrode and the negative electrode;
   a non-aqueous electrolyte; and
   a battery case housing the positive electrode, the negative electrode, the separator, and the non-aqueous electrolyte.

* * * * *